US010592675B2

(12) United States Patent
Dotson et al.

(10) Patent No.: US 10,592,675 B2
(45) Date of Patent: Mar. 17, 2020

(54) METHODS AND SYSTEMS OF ASSESSING AND MANAGING INFORMATION SECURITY RISKS IN A COMPUTER SYSTEM

(71) Applicants: Jeff Dotson, Provo, UT (US); Andrew Watanabe, Provo, UT (US); Joshua Mortensen, Provo, UT (US); Juan Rodriguez, Sandy, UT (US)

(72) Inventors: Jeff Dotson, Provo, UT (US); Andrew Watanabe, Provo, UT (US); Joshua Mortensen, Provo, UT (US); Juan Rodriguez, Sandy, UT (US)

( * ) Notice: Subject to any disclaimer, the term of this patent is extended or adjusted under 35 U.S.C. 154(b) by 158 days.

(21) Appl. No.: 15/661,678

(22) Filed: Jul. 27, 2017

(65) Prior Publication Data

US 2018/0129813 A1 May 10, 2018

Related U.S. Application Data

(60) Provisional application No. 62/378,167, filed on Aug. 22, 2016.

(51) Int. Cl.
*G06F 21/57* (2013.01)
*G06N 20/00* (2019.01)

(52) U.S. Cl.
CPC .......... *G06F 21/577* (2013.01); *G06N 20/00* (2019.01); *G06F 2221/034* (2013.01)

(58) Field of Classification Search
CPC .. G06F 21/577; G06F 2221/034; G06N 20/00
See application file for complete search history.

(56) References Cited

U.S. PATENT DOCUMENTS

| 2003/0212909 A1* | 11/2003 | Chandrashekhar ... G06F 21/577 726/25 |
| 2011/0154498 A1* | 6/2011 | Fissel .................. H04L 63/1433 726/25 |

\* cited by examiner

*Primary Examiner* — Ellen Tran (57) ABSTRACT

In one aspect, a computerized method for assessing and managing information security risks in a computer system includes the step of receiving a customer security assessment. The method includes the step of obtaining a set of already-answered security assessment questions. The method includes the step of applying one or more machine learning methods to generate a strength of one or more similarities scores. The method includes the step of automatically populating one or more direct mappings between the set of already-answered security assessment questions with the other set of questions in a customer security assessment. The method includes the step of setting a baseline score for the one or more direct mappings to already-answered security assessment questions to a set of answered questions in the customer security assessment by using the strength of one or more similarities scores.

4 Claims, 10 Drawing Sheets

Which of these controls are most and least important?

| Most Important | | Least Important |
|---|---|---|
| ○ | Mobile devices have the latest available security-related patches installed upon general release by the device manufacturer or carrier. | ○ |
| ○ | Leverages encryption to protect data and virtual machine images during transport across and between networks and hypervisor instances. | ○ |
| ○ | Requires and enforces via technical controls an automatic lockout screen for BYOD and company owned devices. | ○ |
| ○ | Protects system and network environments by a firewall or virtual firewall to ensure business and customer security requirements. | ○ |
| ○ | Uses dedicated secure networks to provide management access to cloud service infrastructure. | ○ |

METHODS AND SYSTEMS OF ASSESSING AND MANAGING INFORMATION SECURITY RISKS IN A COMPUTER SYSTEM

CROSS-REFERENCE TO RELATED APPLICATIONS

This application claims priority to U.S. Provisional Application No. 62/378,167, titled and METHODS AND SYSTEMS OF ASSESSING AND MANAGING INFORMATION SECURITY RISKS filed on 22 Aug. 2016. This provisional application is incorporated by reference in its entirety.

BACKGROUND

1. Field

This application relates computer-system security and more specifically to a system, article of manufacture and method for assessing and managing information security risks.

2. Related Art

Information Technology (IT) security is an important aspect of the security of any business enterprise. Breaches of the business enterprise's IT security can be costly financially costly. Additionally, a breach of the business enterprise's IT security can have serious legal repercussions. At the same time, it is difficult for a single IT security professional to keep up to date on the latest IT security threats. This information can reside in the IT security professional community as whole. Accordingly, improvements to gathering and applying the wisdom of various IT security professionals in an automated manner can be beneficial to assessing and managing information security risks.

BRIEF SUMMARY OF THE INVENTION

In one aspect, a computerized method useful for assessing and managing information security risks in a computer system includes the step of receiving a customer security assessment. The method includes the step of obtaining a set of already-answered security assessment questions, wherein the set of already-answered security assessment questions comprises a set of security assessments from other vendors that have been answered in the past. The method includes the step of applying one or more machine learning methods to generate a strength of one or more similarities scores, wherein the one or more similarity scores map a set of already-answered security assessment questions with another set of questions in a customer security assessment. The method includes the step of automatically populating one or more direct mappings between the set of already-answered security assessment questions with the other set of questions in a customer security assessment. The method includes the step of setting a baseline score for the one or more direct mappings to already-answered security assessment questions to a set of answered questions in the customer security assessment by using the strength of one or more similarities scores.

BRIEF DESCRIPTION OF THE DRAWINGS

The Figures described above are a representative set, and are not an exhaustive with respect to embodying the invention.

DESCRIPTION

Disclosed are a system, method, and article of manufacture for methods and systems of assessing and managing information security risks in a computer system. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to 'one embodiment,' 'an embodiment,' 'one example,' or similar language means that a particular feature, structure, or characteristic described in connection with the embodiment is included in at least one embodiment of the present invention. Thus, appearances of the phrases 'in one embodiment,' 'in an embodiment,' and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Example Definitions

Bayesian hierarchical modelling can be a statistical model written in multiple levels (e.g. In a hierarchical form) that estimates the parameters of the posterior distribution using the Bayesian method. The sub-models can be combined to form the hierarchical model, and the Bayes' theorem is used to integrate them with the observed data, and account for all the uncertainty that is present. The result of this integration is the posterior distribution.

Conjoint analysis can be a statistical technique used in market research to determine how people value different attributes (e.g. feature, function, benefits) that make up an individual product and/or service.

Fractional factorial experimental designs can be experimental designs consisting of a carefully chosen subset (e.g. a fraction) of the experimental runs of a full factorial design. The subset can be selected so as to exploit the sparsity-of-effects principle to expose information about the most important features of the problem studied, while using a fraction of the effort of a full factorial design in terms of experimental runs and resources.

Machine learning is a type of artificial intelligence (AI) that provides computers with the ability to learn without being explicitly programmed. Machine learning focuses on the development of computer programs that can teach themselves to grow and change when exposed to new data. Example machine learning techniques that can be used herein include, inter alia: decision tree learning, association rule learning, artificial neural networks, inductive logic programming, support vector machines, clustering, Bayesian networks, reinforcement learning, representation learning, similarity and metric learning, and/or sparse dictionary learning.

MaxDiff can be a mathematical model that assumes that respondents evaluate all possible pairs of items within the displayed set and choose the pair that reflects the maximum difference in preference or importance. For example, consider a set in which a respondent evaluates four items: A, B, C and D. If the respondent says that A is best and D is worst, these two responses inform on five of six possible implied paired comparisons: A>B, A>C, A>D, B>D, C>D. The only paired comparison that cannot be inferred is B vs. C. In a choice among five items, MaxDiff questioning informs on seven of ten implied paired comparisons.

Mobile device can include smart phones, cell phones, personal digital assistants, tablet computers, wearable computers, smart watches, smart glasses, etc.

Figure 1:
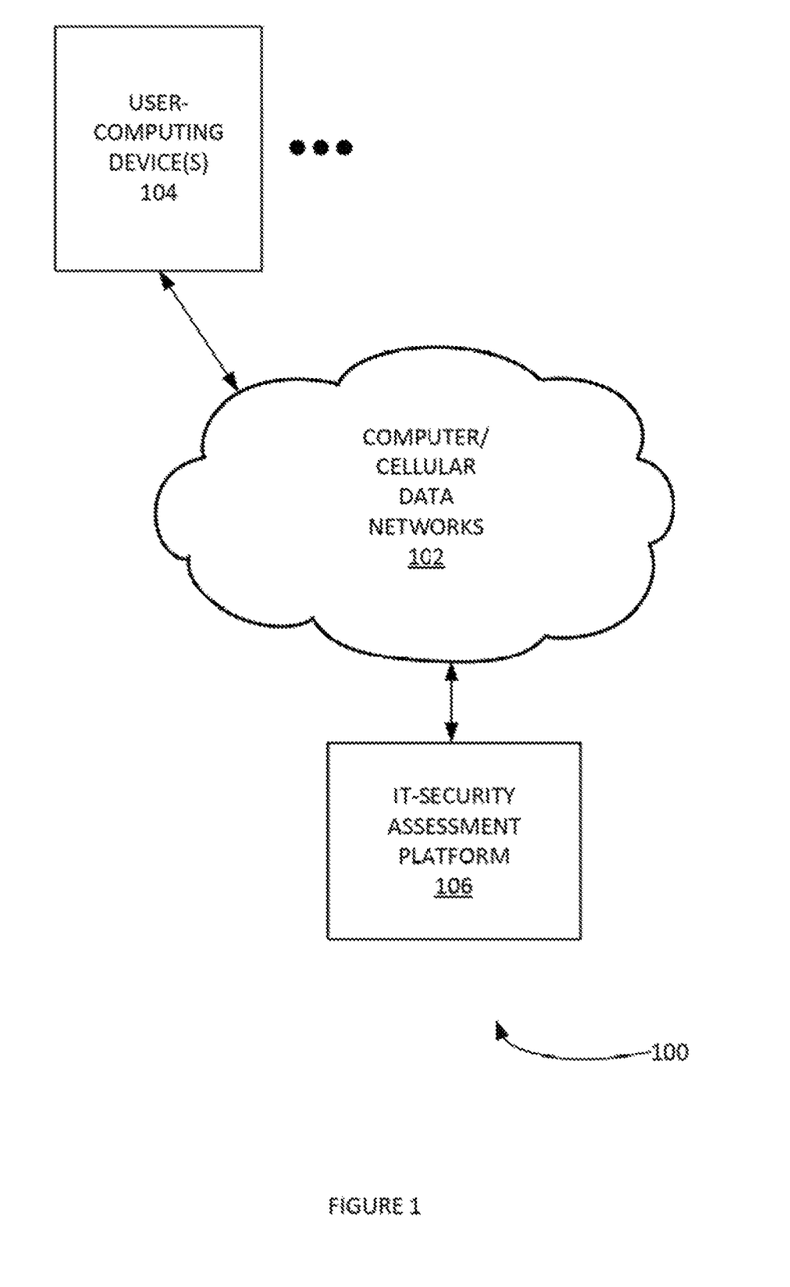
FIG. 1 illustrates an example system for assessing and managing information security risks, according to some embodiments.

Pen test (penetration test) can be an attack on a computer system that looks for security weaknesses, potentially gaining access to the computer's features and data Exemplary Computer Architecture and Systems FIG. 1 illustrates an example system 100 for assessing and managing information security risks (e.g. Crowdscoring, Crowdrisk assessments, etc.), according to some embodiments. System 100 can include various computer and/or cellular data networks 100. Networks 102 can include the Internet, text messaging networks (e.g. short messaging service (SMS) networks, multimedia messaging service (MMS) networks, proprietary messaging networks, instant messaging service networks, email systems, cellular data network, local-area networks, private enterprise networks, etc. Networks 102 can be used to communicate messages and/or other information from the various entities of system 100.

User-computing devices 104 can be any computing device used by a user. For example, user-computing devices 104 can include a web browser, mobile-device application and the like. These can be used to perform the client-side steps of the processes provided infra. For example, IT security exports can input various IT security-related information that can be uploaded to IT-security assessment platform 106. For example, IT security exports can complete questionnaires using user-computing devices 104. The questionnaire data can then be communicated to IT-security assessment platform 106.

Figure 4:
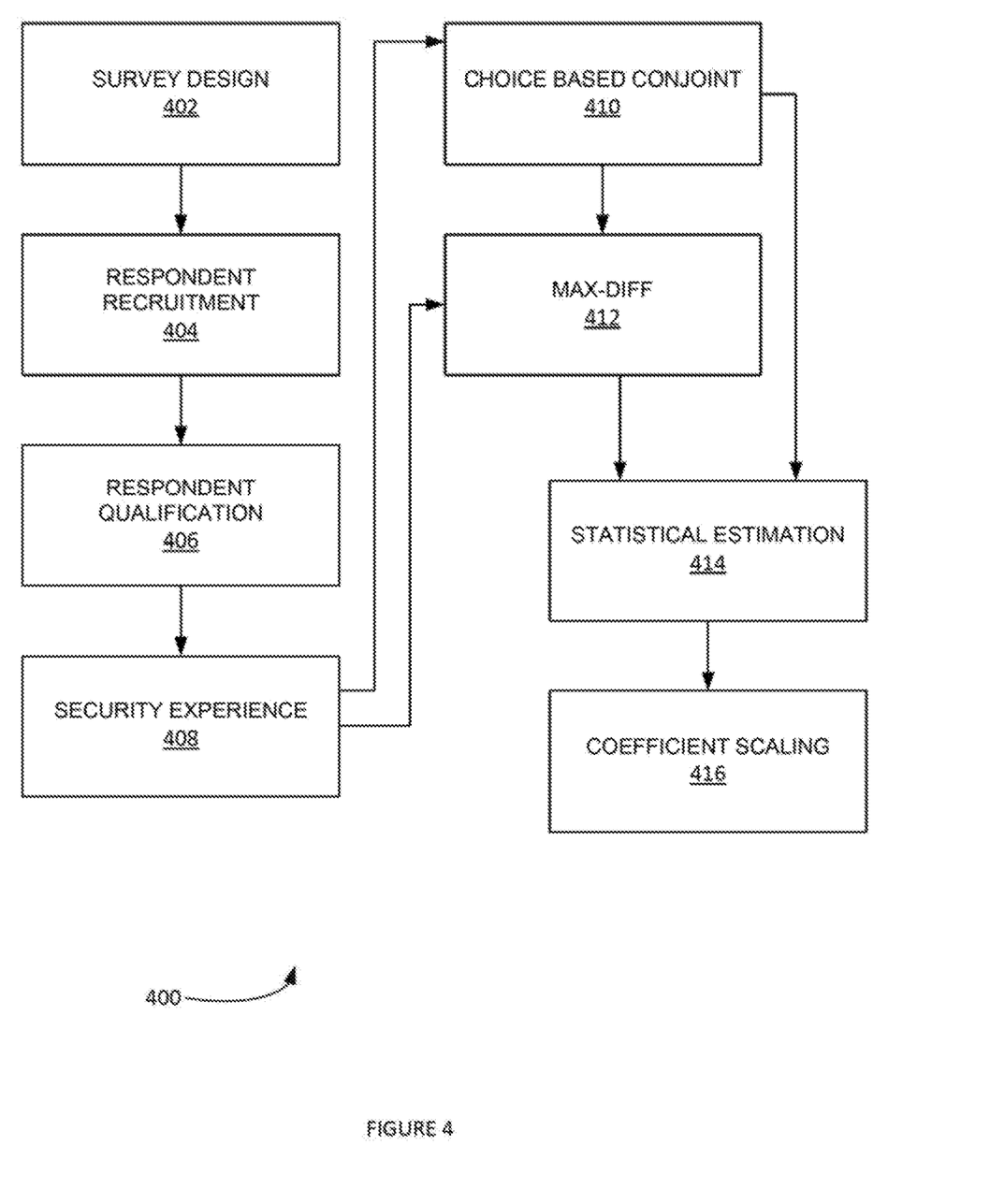
FIG. 4 illustrates an example computerized process for utilizing crowds-sourcing to access a risk score, according to some embodiments.

IT-security assessment platform 106 can include various functionalities for implementing the processes of FIGS. 4-9 provided infra. In some examples, IT-security assessment platform 106 can implement a CrowdRisk methodology. In one example, the CrowdRisk methodology can harness the collective wisdom of IT security professionals in order to understand how a set of items on the Consensus Assessments Initiative Questionnaire (CAIQ) relate to an entity's trust in an IT vendor. In one example, a set of IT-security professionals can complete a 3-stage questionnaire using 2 distinct modalities of preference elicitation questions. Data collected through this process can then be applied to a statistical model. The statistical model can use various hierarchical Bayesian methods to estimate a ratio-scaled coefficient for each item of the set of items in the CAIQ. These parameter estimates can provide information about the relative importance of each item as it relates to an entity's ability to trust an IT vendor. The estimated parameters can be rescaled so that a computed risk score will lie on the interval (e.g. of 300-850). FIG. 4, infra, illustrates an example process flow of the survey design, collection, estimation, and scaling processes. In this way, IT-security assessment platform 106 can algorithmically assess an entity's risk potential as a function of their responses to the IT Security self-assessment. This analysis can provide users with a simple metric that can be used to evaluate current or potential vendors, as well as internal business units or products. It will also provide both buyers and vendors with a way to assess their own IT security risk relative to a set of benchmark firms.

Data store 108 can include various data/information utilized by IT-security assessment platform 106 server(s). For example, data store 108 can include IT-security questionnaire data (e.g. CAIQ data), enterprise IT-security assessment data, CrowdRisk scoring data, etc. Data store 108 can include information used to implement the processes of FIGS. 4-9 provided infra.

Figure 2:
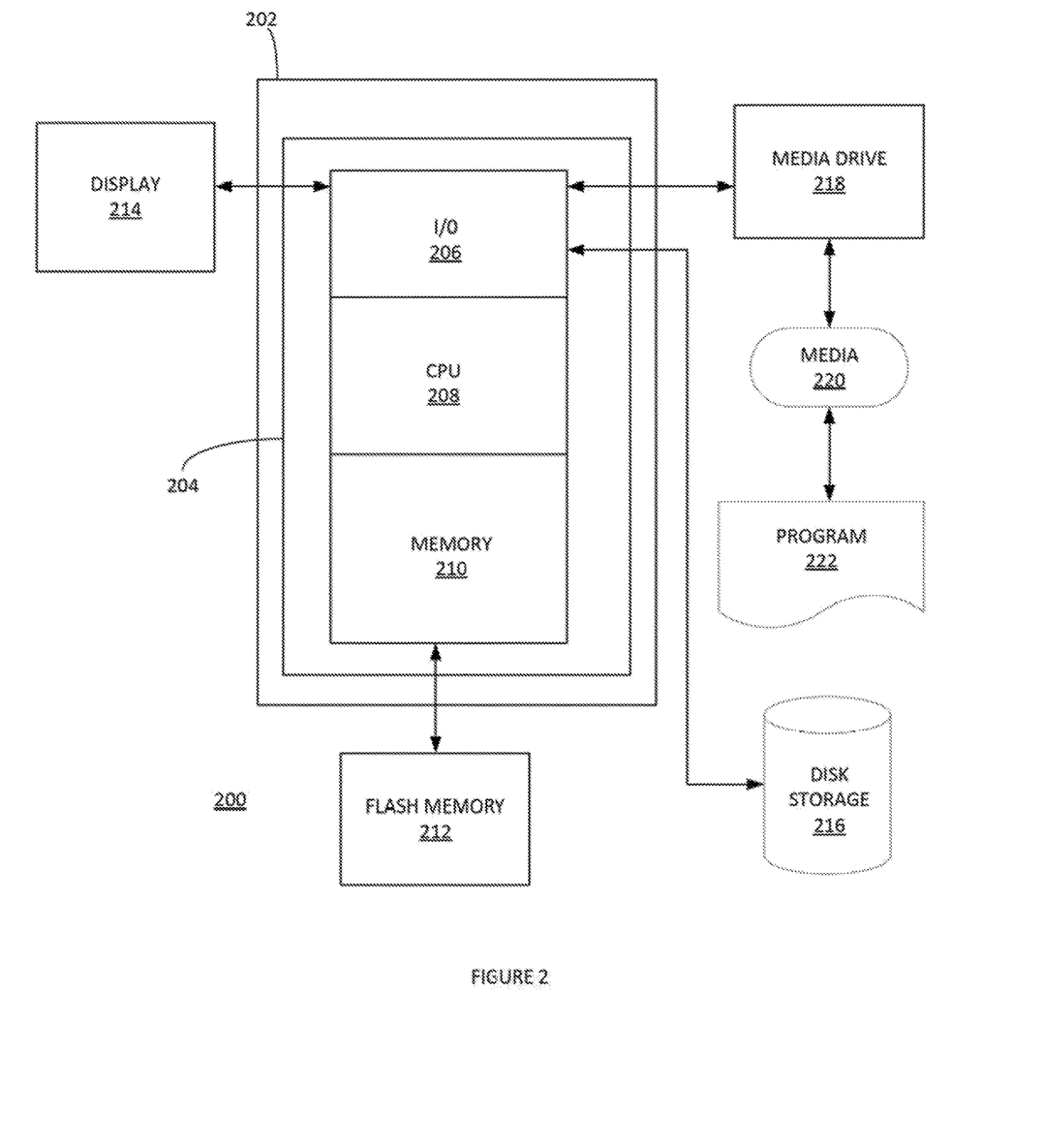
FIG. 2 depicts an exemplary computing system that can be configured to perform any one of the processes provided herein.

FIG. 2 depicts an exemplary computing system 200 that can be configured to perform any one of the processes provided herein. In this context, computing system 200 may include, for example, a processor, memory, storage, and I/O devices (e.g., monitor, keyboard, disk drive, Internet connection, etc.). However, computing system 200 may include circuitry or other specialized hardware for carrying out some or all aspects of the processes. In some operational settings, computing system 200 may be configured as a system that includes one or more units, each of which is configured to carry out some aspects of the processes either in software, hardware, or some combination thereof.

FIG. 2 depicts computing system 200 with a number of components that may be used to perform any of the processes described herein. The main system 202 includes a motherboard 204 having an I/O section 206, one or more central processing units (CPU) 208, and a memory section 210, which may have a flash memory card 212 related to it. The I/O section 206 can be connected to a display 214, a keyboard and/or other user input (not shown), a disk storage unit 216, and a media drive unit 218. The media drive unit 218 can read/write a computer-readable medium 220, which can contain programs 222 and/or data. Computing system 200 can include a web browser. Moreover, it is noted that computing system 200 can be configured to include additional systems in order to fulfill various functionalities. Computing system 200 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

Figure 3:
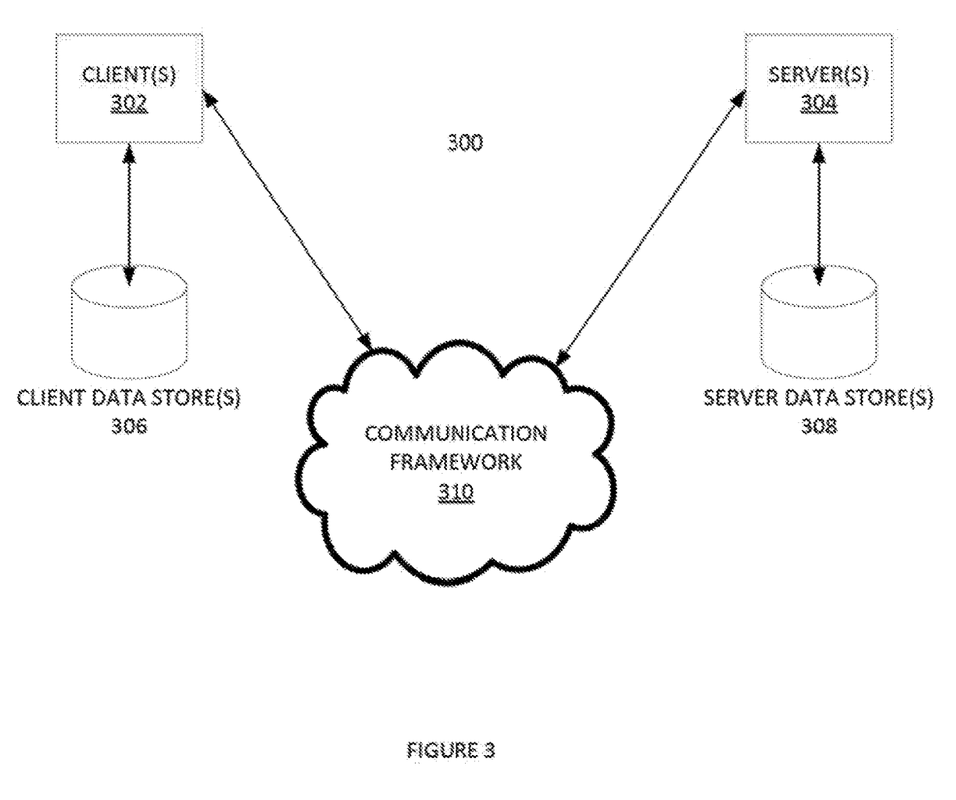
FIG. 3 is a block diagram of a sample-computing environment that can be utilized to implement various embodiments.

FIG. 3 is a block diagram of a sample-computing environment 300 that can be utilized to implement various embodiments. The system 300 further illustrates a system that includes one or more client(s) 302. The client(s) 302 can be hardware and/or software (e.g., threads, processes, computing devices). The system 300 also includes one or more server(s) 304. The server(s) 304 can also be hardware and/or software (e.g., threads, processes, computing devices). One possible communication between a client 302 and a server 304 may be in the form of a data packet adapted to be transmitted between two or more computer processes. The system 300 includes a communication framework 310 that can be employed to facilitate communications between the client(s) 302 and the server(s) 304. The client(s) 302 are connected to one or more client data store(s) 306 that can be employed to store information local to the client(s) 302. Similarly, the server(s) 304 are connected to one or more server data store(s) 308 that can be employed to store information local to the server(s) 304. In some embodiments, system 300 can instead be a collection of remote computing services constituting a cloud-computing platform.

Example Methods

FIG. 4 illustrates an example computerized process 400 for utilizing crowds-sourcing to access a risk score, according to some embodiments. In step 402, process 400 can implement survey design. Survey design can include a CrowdRisk questionnaire. In some examples, the questionnaire can include three components. The questionnaire can include a set of screener questions to determine if respondents are Information technology (IT) security professionals and if they qualified to complete the study. The questionnaire can include a collection of questions used to determine industry affiliation, education level, years of experience, and other meaningful characteristics of the respondent. The questionnaire can include a set of either MaxDiff or Choice-Based Conjoint questions. These can be used to elicit the relative importance of items in the CAIQ. An example of set of Choice-Based Conjoint questions is provided in FIG. 5 infra. An example of set of MaxDiff questions is provided in FIG. 6 infra. In both cases, fractional-factorial experimental design methods can used to reduce the complexity of the design space.

In step 404, process 400 can implement respondent recruitment. Respondents for the initial calibration sample can be recruited from a variety of sources including LinkedIn® groups related to IT security. Other sources can include a commercial panel of IT Security professionals maintained by Survey Sampling International (SSI), Qualtrics, or another survey company. These sources are provided by way of example and not of limitation.

In step 406, process 400 can implement respondent qualification. For example, in order to qualify for participation in the study, a respondent can be required to have worked in the field of IT Security. In another example, the respondent can be determined to be familiar with the IT Security risk assessment process. Various parameters can be provided. These can include, inter alia: years works, educational attainment, awards/honors in IT security field awarded, prestige of past employers, etc.

In step 408 process 400 can implement a security experience. For example, once qualified, respondents can complete a variety of questions to assess their demographic and professional backgrounds. Respondents can also provide a description of the nature of the IT security-assessment process at their current place of employment.

At this stage in the questionnaire, respondents can be randomly divided (e.g. a fifty-fifty (50/50) split, a forty-sixty (40/60) split, etc.) into one of two paths as provided in steps 410 and 412. Each of the two paths can involve methods used to elicit a relative-rank ordering over items in the CAIQ, but use a different approach to do so.

In step 410, process 400 can provide Choice-Based Conjoint questions to a subset of the respondents. In one example, respondents branched into the Choice-Based Conjoint questions can be shown a collection of four (4) prospective firms that differ with respect to the presence or absence of five (5) security characteristics (e.g. see FIG. 5). The respondents can be asked to pick the firm that they would trust the most as a prospective vendor. The process is repeated eight (8) times with a new set of statements and characteristics.

In step 412, process 400 can implement max-diff to another to a subset of the respondents. In the MaxDiff condition, respondents can be re-shown a collection of five (5) security protocols. The respondents can be asked to pick the most and least important protocol from the list. This process can also be repeated eight (8) times for each respondent.

In step 414, process 400 can implement a statistical estimation using the data collected through both the MaxDiff and Choice Based Conjoint tasks. For example, the data collected through both the MaxDiff and Choice Based Conjoint tasks can be pooled together (e.g. with the corresponding design matrix). The pooled data can be used to estimate a model where the probability of each discrete choice, i, is made according to the following formula:

$$\text{prob}(y_i = j) = \frac{e^{x'_j B}}{\sum_k e^{x'_k B}}$$

Where $y_i$ denotes the choice made by the respondent and beta (in vector notation) is the set of weights for the questions. Given the expression above, process 400 can derive a likelihood for data. Process 400 can then use various Bayesian statistical methods to estimate the model parameters.

In step 416, process 400 can implement coefficient scaling. Coefficient scaling involves transforming the raw coefficients estimated from the model so that they can be more easily interpreted. For example, the estimated collection of coefficients can be scaled according to the following formula to be located on the 300 to 850 interval according to the following formula. The result is a 'CrowdScore'.

$$300 + \sum_{i=1}^{295} 550 * \left(B_i / \sum_i B_i\right) * I(q_i = 1)$$

Process 400 can also utilize feedback learned from the crowd. In addition to the research used to gather the initial data behind the CrowdScore algorithm, process 400 continuously add to the data set it utilizes. For example, process 400 can track the decision patterns of customers on a platform (e.g. IT-security assessment platform 106, etc.). Each vendor that completes an assessment on the platform, can provide a data set detailing their security posture. Process 400 can then compare that data set with the customer's decision to accept or deny a vendor. As the volume of decisions increases on the platform process 400 can determine the responses that are driving the decisions of the customers.

These decisions can be defined as heuristics. These heuristics can use to identify the security measures and/or controls that organizations view as most critical for their vendors to possess and/or utilize.

In some examples, process 400 can also learn from the crowd in the platform. Process 400 can track questions scores as: CrowdRisk, Overridden, and New. CrowdRisk can be a default state. A CrowdRisk score can be obtained as a scores from the CrowdRisk algorithm provided supro. An overridden score can be scores that had a CrowdRisk score but a user provided a different score. A new score can be a question that was never mapped back to an existing question, but that has a CrowdRisk score provided by a user.

Questions that are overridden can be treated as responses to the CrowdRisk score survey. In some examples, process 400 can give these more weight because a trusted security professional provided the score.

A CrowdRisk assessment can also be provided. The CrowdRisk assessment can include a questionnaire that changes (e.g. depending on the current needs of security professionals, etc.). Questions can be added and/or removed depending on their CrowdRisk score. In some examples, a new question can be added when it is noted that a specified number of users have added it to their custom assessment and the average score (e.g. the new score discussed supra).

Figure 5:
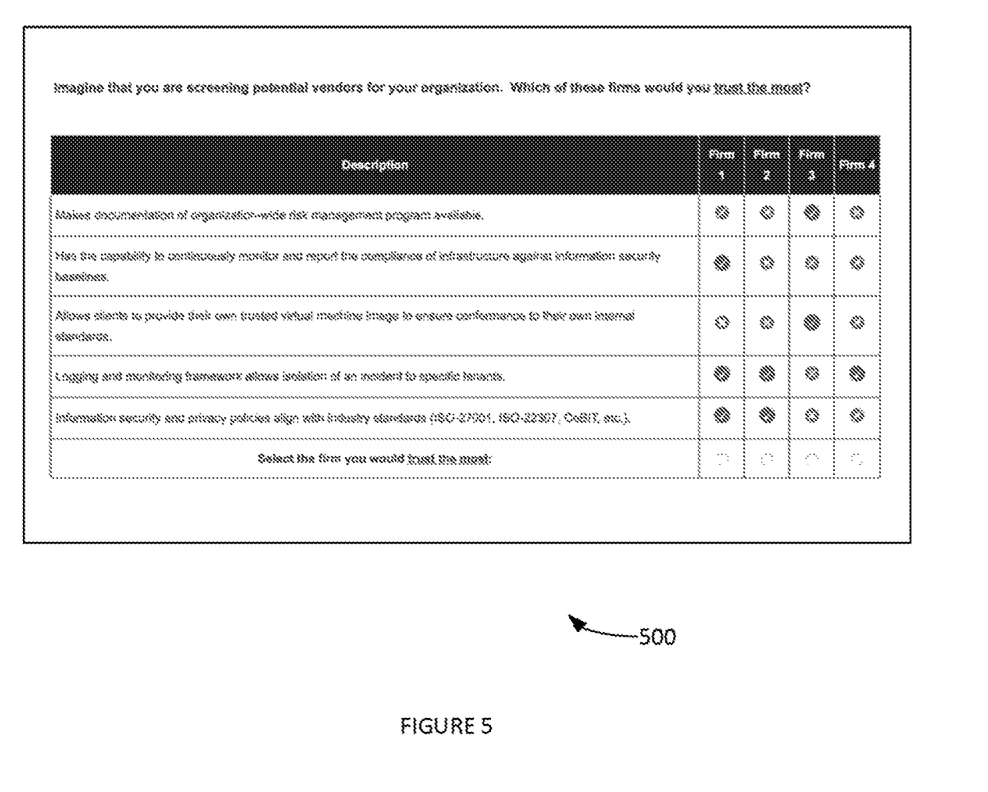
FIG. 5 illustrates an example screen shot of a set of Choice-Based Conjoint task questions, according to some embodiments.
Figure 6:
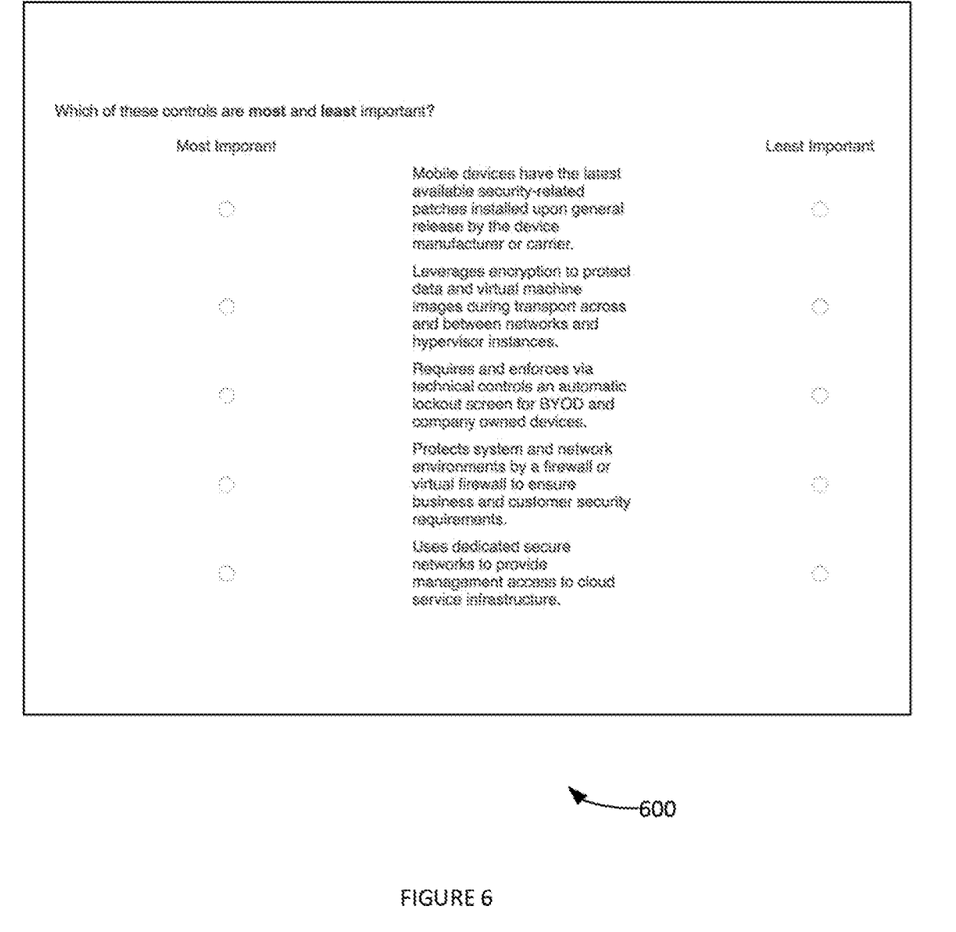
FIG. 6 illustrates an example screen shot of a set of MaxDiff Task questions, according to some embodiments.

FIG. 5 illustrates an example screen shot of a set of Choice-Based Conjoint task questions, according to some embodiments. FIG. 6 illustrates an example screen shot of a set of MaxDiff Task questions, according to some embodiments.

Figure 7:
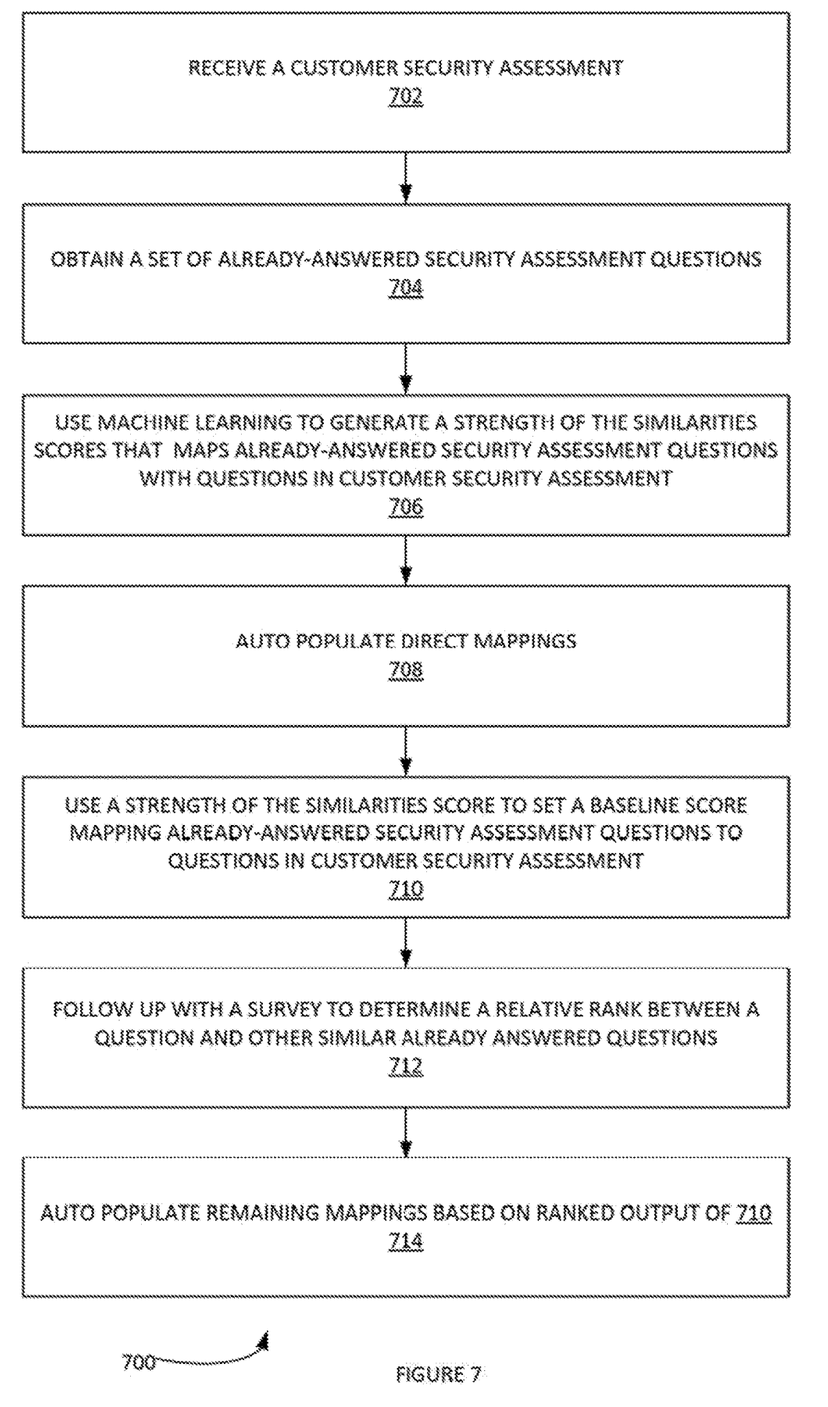
FIG. 7 illustrates an example process for auto mapping scores across assessments, according to some embodiments.

FIG. 7 illustrates an example process 700 for auto mapping scores across assessments, according to some embodiments. It is noted that vendors may be required by their customers to complete a security-posture assessment (e.g. to show ability to protect customer data, etc.). Example assessments may be based on standards, such as, inter alia, the Cloud Security Alliance, ISO 27001, SOC 2, HIPPA, and/or PCI. Organizations can also create their own custom assessments, which may or may not be based on a standard assessment. Many of the customer assessments may be similar to each other. For example, many of the standards and custom assessments are asking similar questions, which may be worded differently, in order to ascertain the same answer. The objective of the assessment is to solicit a response that allows the customer to understand the riskiness, from an IT security, perspective of the vendor. At the same time, many customers do ask questions specific to their business, geographic locality, or regulatory environment. The vendors are typically not able to provide a pre-completed questionnaire to their customers, because it would lack many of the custom or specific questions necessary from the perspective of the customers. Vendors may then have to answer hundreds or even thousands of assessments, which are essentially asking many of the same questions. Process 700 can enable a vendor to answer a question once and then auto-populate their responses to any number of assessments that may be asking the same questions. In this way, the vendor avoids the duplication of effort across many customer requests. From the customer's perspective, this process 700 enable their vendors to respond much quicker to their requests, and increased turn-around time for their vendor risk management personnel.

More specifically, in step 702, process 700 can receive a customer security assessment. In step 704, process 700 can obtain a set of already-answered security assessment questions. These can be security assessments from other vendors that have been answered in the past.

In step 706, process 700 can use machine learning to generate a strength of the similarities scores that maps already-answered security assessment questions with questions in customer security assessment. In some examples, this mapping can be performed using machine learning to narrow the possible mappings and then crowdsourcing to select the question or set of questions. The mapping process can enable process 700 to auto-populate from one assessment to another. A score related to an answer is also generated through the mapping processes.

In step 708, process 700 can auto populate direct mappings. In step 710, process 700 can use a strength of the similarities score to set a baseline score mapping already-answered security assessment questions to questions in customer security assessment. For example, even if no direct mappings our find in a preceding step, process 700 can use the strength of the similarities to set a baseline for the score that can evolve over time via overrides.

In step 712, process 700 can follow up with a survey to determine a relative rank between a question and other similar already answered questions. If the confidence score isn't above a specified parameter, then process 700 can follow up with a survey to find the relative rank between the question and those similar to it. Based on the results of the survey process 700 can set a baseline score. In step 714, process 700 can auto populate remaining mappings based on ranked output of 710.

An example process for Crowdrisk scoring based on network is now provided. It is noted that a vendor's Crowdrisk score can be affected by the Crowdrisk scores of its own vendors. In one example, a company in isolation can have a perfect score (e.g. of eight hundred and fifty (850)). The company can then utilize a vendor with the following characteristics: [Criticality Level=Nice to Have, Risk Level=Low Risk, CrowdRisk Score=three hundred and fifty (350)]. Therefore, the company's new Crowdrisk score can decrease based on the riskiness of its new vendor. For example, the new Crowdrisk score can be eight hundred (800). This can be a reduction of fifty (50) points due to the new vendor.

In another example, a company in isolation can again have a perfect Crowdrisk score (e.g. of eight hundred and fifty (850)). The company can then utilize a new vendor. The new vendor can have the following characteristics: [Criticality Level=Mission Critical, Risk Level=High Risk, CrowdRisk Score=350]. The company's new Crowdrisk score can decrease based on the riskiness of its new vendor. For example, the company's new Crowdrisk score can be set to six hundred (600). This can be a reduction of two hundred and fifty (250) points.

In both of these examples, the vendor's score was much lower than the procuring company's score. Moreover, the fluctuation of the score can be dramatically different based on the other risk classifications of the new vendor.

Figure 8:
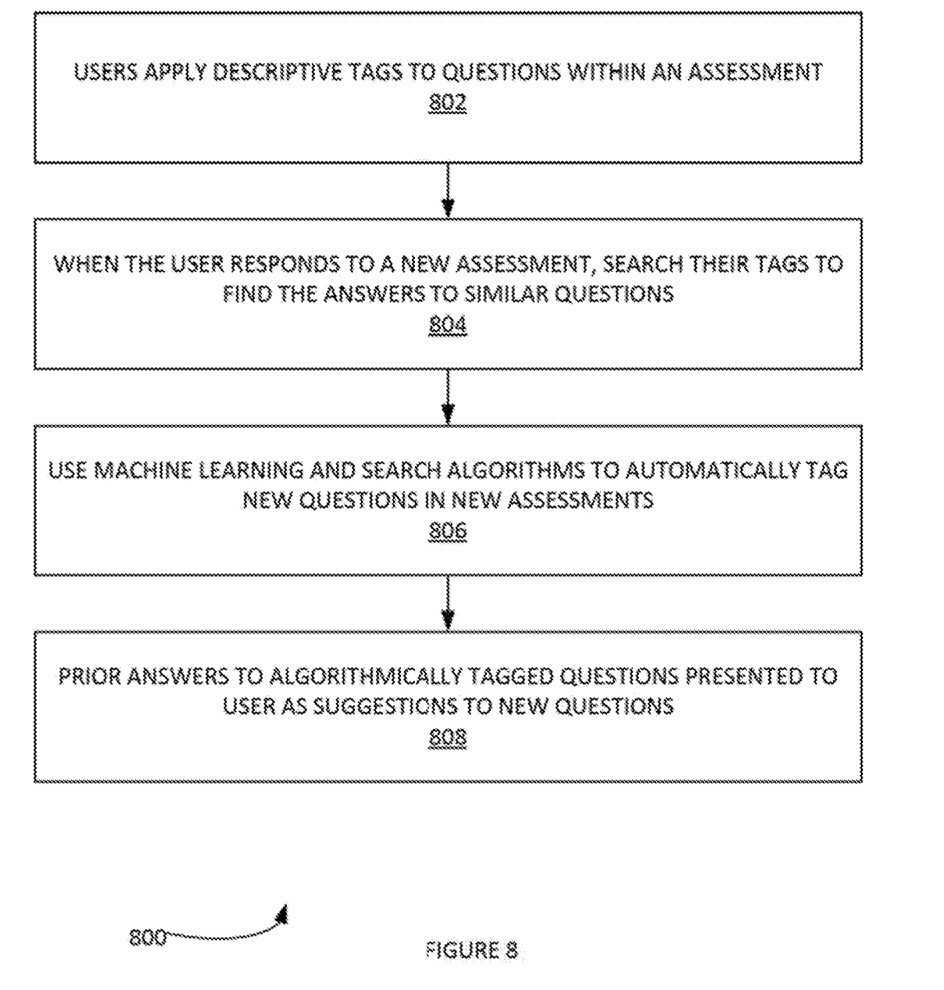
FIG. 8 illustrates an example process of a question repository based on tagging, according to some embodiments.

FIG. 8 illustrates an example process 800 of a question repository based on tagging, according to some embodiments. In step 802, user (e.g. a customer, etc.) manually apply descriptive tags to questions within any assessment. For example, a question may be: "Prior to granting customers access to data, assets, and information systems, identified security, contractual, and regulatory requirements for customer access shall be addressed." The user can then add the following tags: ["regulation", "contracts", "requirements"]. In step 804, when the user responds to a new assessment, they can search their tags to find the answers to similar questions. This can enable a user with lesser understanding of a subject to answer the new question. In step 806, process 800 can use machine learning and search algorithms to automatically tag new questions in new assessments. The prior answers to those algorithmically tagged questions can be presented to the user as suggestions to new questions that the user is responding to in step 808.

It is noted that the methods and systems herein can be used to develop a probability of a hack based on a set of specified data. The platform (e.g. IT-security assessment platform 106, etc.) can utilize predictive analytics on the data it gathers. These analytics can be used to understand various security gaps and scenarios that may lead to a breach or data loss event. Within the platform, companies can create security profiles that detail the security measures they have taken to protect themselves. These profiles can also include flaws that may exist in their systems and or processes. The platform can couple this data with the security profiles of companies that have experienced breaches and/or data loss events to make predictions of which companies are the most likely to fall victim to a breach or data loss event. This data can be shared with the company to suggest specific improvements to their security position and avoid a breach. It can also be used to show a company that they share a similar risk profile to others who have experienced known breaches.

It is noted that the methods and systems herein can be used to develop predictive capabilities based on correlation of data and a pen test. The data gathered through the platform can also enable the coupling of a company's security profile with the results of external penetration tests run against the company's network and application. The resulting combination of internal and external data can enable predictions of which companies are the most likely to fall victim to a breach or data loss event. This data can then be shared with the company to help them improve their security position and avoid a breach. This data can also or help a company identify whether a breach has occurred and how to fix it.

Figure 9:
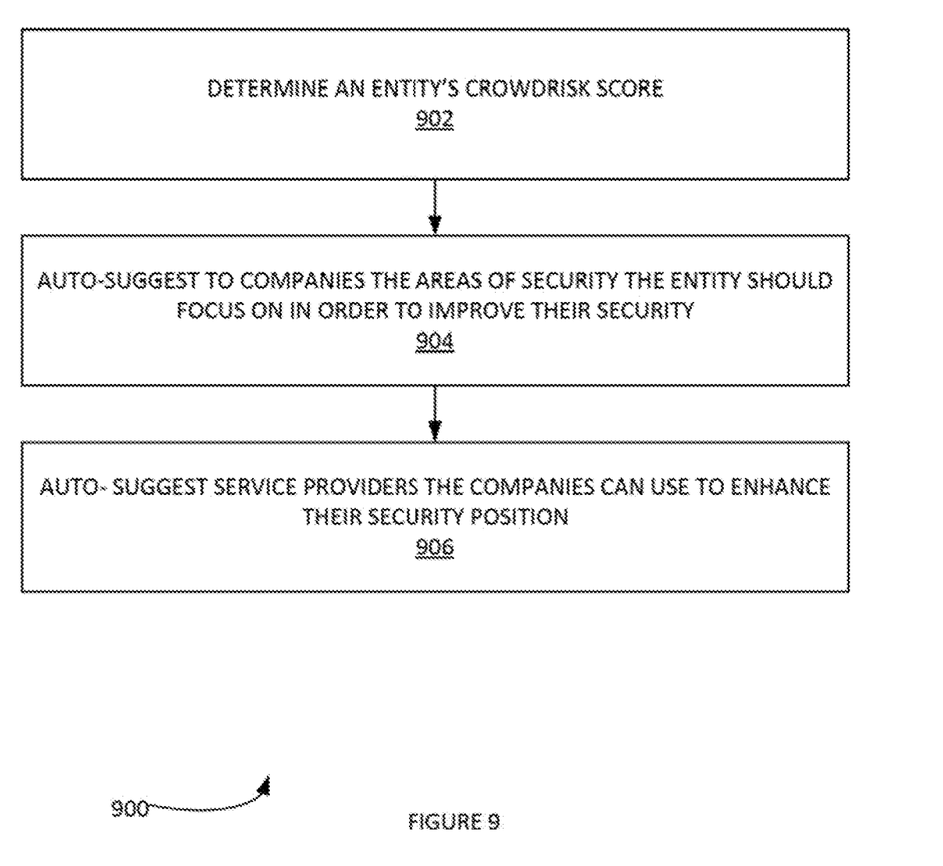
FIG. 9 illustrates an example process for generating auto-suggestions to vendors to fill service gaps based on the results of an assessment/gap analysis, according to some embodiments.

FIG. 9 illustrates an example process 900 for generating auto-suggestions to vendors to fill service gaps based on the results of an assessment/gap analysis, according to some embodiments. It is noted that one of the challenges for organizations that are trying to become more secure, is knowing where to spend their resources in order to improve. An organization may not have the capability to hire high-level information security professionals and/or a team with the breadth of knowledge to address all security issues. In addition, vendors may be unaware of the security requirements customers may impose upon them until after the assessment process is completed. In step 902, process 900 can obtain an entity's (e.g. a company's) Crowdscore (e.g. by implementing the processes provided supra such as CrowdRisk scoring). In step 904, using the CrowdScore algorithm, process 900 can then auto-suggest to the entity the areas of security they can focus on first in order to improve their security. Process 900 can also auto-suggestion steps for an entity to improve their CrowdScore, and their ability to sell to customers. In step 906, process 900 can auto-suggest various service providers that the entity can use to enhance their security position.

Security assessment can be a gap analysis for an organization's security controls. Once an organization has completed an assessment, process 900 can also automatically analyze the gaps and compare them to the learning we've gained from the CrowdScore algorithm and the usage patterns of the customers on our platform. Process 900 can then auto-recommend the gaps to fill and/or service providers that may be useful in filling those gaps.

A method is provided for service providers bid for advertisements and/or other placements based on vendor profiles. When a company self-assesses, it can determine/find various gaps in their security. These gaps can be matches with a service provider's offerings. Various methods of enabling a matched service provider to make offers/advertisements to the company can be implemented. For example, the service provider can bid for keywords. The service provide can bid based on profiles (e.g. the service provider could bid to show their services to a company with characteristics [1, 2, 3, 4, n . . . ]). This can provide a targeted and efficient way of selling those services to customers who specifically need them.

A method of a security graph based on profiles created from one or more self-assessments is now discussed. A graphical method for showing the connection points between a company, its vendors, the vendors of its vendors, etc. can be implemented. For example, various points of connection can be defined as a commonality that exist between the various analyzed companies (e.g. a company with a CrowdRisk assessment, etc.). For example, weak connections like two companies answering YES to the same question—to stronger connections, such as companies that have API access into a common database. The graph can be reconfigured according to varying filters and even displayed in a dynamic, visual manner.

In some embodiments, a news scanner can be implemented. The news scanner can pull keywords related to security, service outages, and any other desired event. These keywords can be analyzed and use to highlight risk based activities for other companies using related services. For example, an enterprise user may have numerous vendors, about whom they are desirous to gather all manner of contextual data to establish the company's risk position. The news scanner can pull in news articles about each vendor and attach these articles to that vendor's profile. When important concepts such as "data breach" or "service outage" show up in the news articles, an alert can be triggered so that a company procuring that vendor's services can take notice and evaluate the risk position in light of this new information. Additionally, an archive of security events used to materially affect the risk score for that vendor can also be created and updated.

In some embodiments, machine learning can be used to auto-create clever and 'cute' emoji through the use of crowdsourced vendor responses to an assortment of events that are of varying degrees of 'cuteness'. For example, machine learning can also be used create clever word mashups for news headlines.

Additional Process

Figure 10:
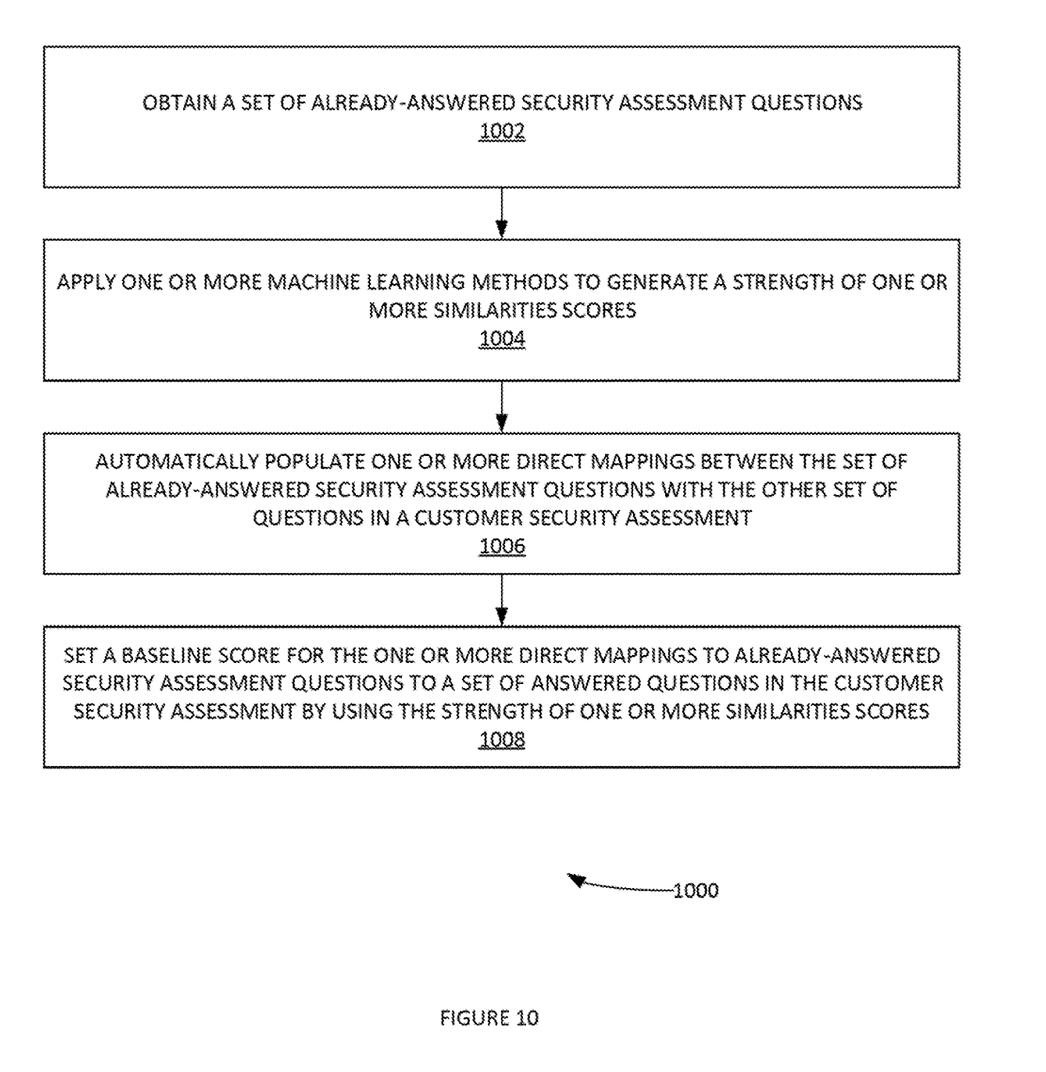
FIG. 10 illustrates a process useful for assessing and managing information security risks in a computer system includes the step of receiving a customer security assessment, according to some embodiments.

FIG. 10 illustrates a process 1000 useful for assessing and managing information security risks in a computer system includes the step of receiving a customer security assessment, according to some embodiments. In step 1002, process 1000 obtains a set of already-answered security assessment questions. The set of already-answered security assessment questions comprises a set of security assessments from other vendors that have been answered in the past. In step 1004, process 1000 applies one or more machine learning methods to generate a strength of one or more similarities scores. The one or more similarity scores map a set of already-answered security assessment questions with another set of questions in a customer security assessment. In step 1006, process 1000 automatically populates one or more direct mappings between the set of already-answered security assessment questions with the other set of questions in a customer security assessment. In step 1008, process 1000 sets a baseline score for the one or more direct mappings to already-answered security assessment questions to a set of answered questions in the customer security assessment by using the strength of one or more similarities scores.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it will be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed as new and desired to be protected by Letters Patent of the United States is:

1. A computerized method useful for assessing and managing information security risks in a computer system comprising:

receiving a customer security assessment, wherein the customer security assessment comprises a set of digitally answered questions answer by an information technology security expert in an entity, and wherein the set of digital answered questions comprises a set of MaxDiff or Choice-Based Conjoint questions;

obtaining a set of already-answered security assessment questions, wherein the set of already-answered security assessment questions comprises a set of security assessments from other vendors that have been answered in the past;

determining a relative rank between a question in the customer security assessment and the set of already-answered security assessment questions;

applying one or more machine learning methods to generate a strength of one or more similarities scores, wherein the one or more similarity scores map a set of already-answered security assessment questions with another set of questions in a customer security assessment;

automatically populating one or more direct mappings between the set of already-answered security assessment questions with the other set of questions in a customer security assessment;

using the strength of the one or more similarities scores to set a baseline for the score that can evolve over time via a set of overrides;

setting the baseline score for the one or more direct mappings to already-answered security assessment questions to a set of answered questions in the customer security assessment by using the strength of one or more similarities scores;

ranking the one or more direct mappings according to a set of baseline scores; and based on the ranking, automatically populating one or more non-direct mappings between the set of already-answered security assessment questions with the other set of questions in a customer security assessment.

2. The computerized method of claim 1 further comprising the step of:

following up with a survey to determine a relative rank between a question and other similar already answered questions in the customer security assessment.

3. A computer system useful for assessing and managing information security risks in a computer system comprising:

a processor;

a memory containing instructions when executed on the processor, causes the processor to perform operations that:

receive a customer security assessment, wherein the customer security assessment comprises a set of digitally answered questions answer by an information technology security expert in an entity, and wherein the set of digital answered questions comprises a set of MaxDiff or Choice-Based Conjoint questions;

obtain a set of already-answered security assessment questions, wherein the set of already-answered security assessment questions comprises a set of security assessments from other vendors that have been answered in the past;

determine a relative rank between a question in the customer security assessment and the set of already-answered security assessment questions;

apply one or more machine learning methods to generate a strength of one or more similarities scores, wherein the one or more similarity scores map a set of already-answered security assessment questions with another set of questions in a customer security assessment;

automatically populate one or more direct mappings between the set of already-answered security assessment questions with the other set of questions in a customer security assessment;

use the strength of the one or more similarities scores to set a baseline for the score that can evolve over time via a set of overrides;

set a baseline score for the one or more direct mappings to already-answered security assessment questions to a set of answered questions in the customer security assessment by using the strength of one or more similarities scores;

rank the one or more direct mappings according to a set of baseline scores; and based on the ranking, automatically populate one or more non-direct mappings between the set of already-answered security assessment questions with the other set of questions in a customer security assessment.

4. The computerized system of claim 3, wherein the memory containing instructions when executed on the processor, causes the processor to perform operations that:

following up with a survey to determine a relative rank between a question and other similar already answered questions in the customer security assessment.

* * * * *